(12) United States Patent
Cho et al.

(10) Patent No.: US 7,155,837 B2
(45) Date of Patent: Jan. 2, 2007

(54) GEOMAGNETIC SENSOR FOR DETECTING DIP ANGLE AND METHOD THEREOF

(75) Inventors: Woo-jong Cho, Suwon-si (KR); Seong-yun Cho, Seoul (KR); Chan-gook Park, Seoul (KR); Sang-on Choi, Suwon-si (KR); Woo-jong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/051,467

(22) Filed: Feb. 7, 2005

(65) Prior Publication Data

US 2005/0183274 A1   Aug. 25, 2005

(30) Foreign Application Priority Data

Feb. 6, 2004   (KR) ............... 10-2004-0007974

(51) Int. Cl.
  *G01C 17/38*   (2006.01)
(52) U.S. Cl. .......................................... 33/356
(58) Field of Classification Search ............. 33/356
  See application file for complete search history.

(56) References Cited

U.S. PATENT DOCUMENTS 4,116,057 A  *  9/1978  Sullivan ....................... 33/356
5,440,303 A  *  8/1995  Kinoshita .................... 33/356
6,836,971 B1 *  1/2005  Wan ............................ 33/356
6,957,156 B1 * 10/2005  Jo et al. ...................... 33/356

FOREIGN PATENT DOCUMENTS

JP       9-81308 A       3/1997
JP       9-325029 A      12/1997
KR    2003-0067471 A     8/2003

* cited by examiner

*Primary Examiner*—Christopher W. Fulton
(74) *Attorney, Agent, or Firm*—Sughrue Mion, PLLC

(57) ABSTRACT

A geomagnetic sensor includes a geomagnetic detection module configured to output an electrical signal having a magnitude corresponding to a magnetic field; a memory configured to store an azimuth measured in a horizontal plane; an accelerometer module configured to measure a tilt at present, and to compute a tilt angle therefrom; and a controller configured to calculate a dip angle by using the electrical signal outputted from the geomagnetic detection module, the tilt angle, and the horizontal azimuth. A method for detecting a dip angle by a geomagnetic sensor includes outputting an electrical signal having a magnitude corresponding to an external geomagnetic field; detecting an azimuth in a horizontal plane and storing the detected azimuth; measuring a tilt at present and computing a tilt angle thereof; and calculating a dip angle by using the electrical signal, the tilt angle, and the azimuth measured in the horizontal plane.

12 Claims, 6 Drawing Sheets

GEOMAGNETIC SENSOR FOR DETECTING DIP ANGLE AND METHOD THEREOF

CROSS-REFERENCE TO RELATED APPLICATIONS

This application claims priority from Korean Patent Application No. 10-2004-0007974 filed on Feb. 6, 2004, the entire content of which is incorporated herein by reference.

BACKGROUND OF THE INVENTION

1. Field of the Invention

The present invention relates in general to a geomagnetic sensor for detecting a dip angle and a method thereof, more particularly, to a geomagnetic sensor for detecting a present dip angle through a simple operation using a 2-axis fluxgate and a method thereof.

2. Description of the Related Art

A geomagnetic sensor is an instrument for measuring the intensity and direction of a geomagnetic field which human beings are not able to sense. A geomagnetic sensor using a fluxgate is called a geomagnetic fluxgate sensor.

In particular, the geomagnetic fluxgate sensor has a magnetic core made from high permeability materials, such as permalloy. To measure the intensity and direction of an external magnetic field, an induced magnetic field is applied through winding the magnetic core with coils, and second harmonic components proportional to the external magnetic field that varies depending on magnetic saturation of the magnetic core and non-linear magnetic The magnetic fluxgate sensor was first developed at the end of 1930's. Compared with other geomagnetic sensors, it features high sensitivity, low manufacture cost, small size, low power consumption, and long-term stability of output signals. Because of these merits, the magnetic fluxgate sensor has been broadly used not only for military use, but also for civilian demands, such as, detection of a weak magnetic field, measurement of the absolute direction of the Earth's magnetic field, exploration of a vein of ore, target detection, control of a satellite's position, and space exploration. Studies on the improvement of the magnetic fluxgate sensor's performance are still in progress.

The recent development of Micro-Electro-Mechanical Systems (MEMS) technology has served to motivate the development of a low-power consumption, microminiature fluxgate sensor.

FIG. 1 is a schematic block diagram of a related art geomagnetic sensor. As shown in FIG. 1, the geomagnetic sensor 10 includes a drive signal generator 11, a geomagnetic detection module 12, a signal processor 13, a controller 14, a memory 15, and an accelerometer module 16.

The drive signal generator 11 generates a signal for driving the geomagnetic detection module 12. Usually, pulse-type and inverted pulse-type drive signals are used.

The geomagnetic detection module 12 includes two fluxgates that are orthogonal to each other. Each fluxgate includes a rectangular ring-shaped or bar-shaped magnetic core, a drive coil wound around the core, and a detection coil. The drive coil receives an electrical drive signal outputted from the drive signal generator 11, and magnetizes the core. The detection coil detects an electromotive force induced from the magnetic field generated by the drive coil.

In the meantime, if a voltage component proportional to the intensity of an external magnetic field is induced in the detection coil, the signal processor 13 amplifies and chops the voltage component, and then outputs a voltage value corresponding to each axis.

The controller 14 measures the voltage value outputted from the signal processor 13, and the geomagnetic sensor's azimuth at present. In general, an electrical signal outputted from each fluxgate of the geomagnetic detection module 12 changes according to the change in tilt angle of the geomagnetic sensor. If the change in the tilt angle is great, the azimuth measurement can be erroneous. In such case, the effect of the tilt needs to be calibrated on the basis of the tilt calibration algorithm. To calibrate the effect of the tilt according to the tilt calibration algorithm, the tilt of the present geomagnetic sensor 10, i.e., pitch angle and roll angle, should be measured first, and a dip angle at the present position of the geomagnetic sensor 10 is measured next.

The accelerometer module 16 measures the acceleration of gravity of the geomagnetic sensor 10, and computes the pitch angle and the roll angle. Similar to the geomagnetic detection module 12, the accelerometer module 16 includes two orthogonal accelerometers. The pitch angle and the roll angle indicate how much the geomagnetic sensor 10 is tilted, that is, the tilt angle of the geomagnetic sensor 10. More specifically, the pitch angle is the angle of rotation between the plane containing the geomagnetic sensor 10 and one of two orthogonal axes (X-axis and Y-axis). The roll angle is the angle of rotation between the plane containing the geomagnetic sensor 10 and the other axis.

To measure the pitch angle and the roll angle, the accelerometer module 16 usually employs a weight having a constant mass in order to check the motion of the weight against the force of gravity visually or through an angle meter, a rulers or an indication needle. The pitch angle and the roll angle measurements are stored in the memory 15.

In case of compensating the tilt, the controller 14 normalizes voltage values of the X-axis and the Y-axis outputted from the signal processor 13, and computes the azimuth by using the pitch angle and the roll angle measured by the accelerometer module 16, and the dip angle at the present position. Here, dip angle is one of three elements of the terrestrial magnetism (declination, dip angle, and horizontal magnetic force), and is the angle between a magnetic needle and a horizontal plane as the magnetic needle freely rotates on a vertical plane. For instance, the dip angle of Korea ranges approximately from 50° to 60°.

Traditionally, a specific dip angle was given to each geographic area, or a dip angle was inputted from an external device, e.g., a Global Positioning System ("GPS"), for the calculation of azimuth. Using the dip angle designated per area is effective if the area is not changed. Otherwise, a new dip angle should be inputted every time the area changes. Also, even within the same area, the intensity of the Earth's magnetic field is distorted and thus, the designated dip angle can be in error. On the other hand, to receive the dip value from the external device, e.g., the GPS, an additional equipment for communicating with the external device is required. Therefore, the size and manufacturing cost of the geomagnetic sensor are increased.

SUMMARY OF THE INVENTION

The sensor disclosed herein provides a geomagnetic sensor for detecting a dip angle at a present position by using a horizontal azimuth and a tilt, and a method thereof.

To achieve the above object, there is provided a geomagnetic sensor, including: a geomagnetic detection module to output an electrical signal having a magnitude corresponding to a magnetic field; a memory configured to store an azimuth measured in a horizontal plane; an accelerometer module configured to measure a tilt at present, and configured to compute a tilt angle therefrom; and a controller configured to calculate a dip angle by using the electrical signal outputted from the geomagnetic detection module, the tilt angle, and the horizontal azimuth.

The accelerometer module may further include orthogonal X-axis and Y-axis geomagnetic sensors configured to detect the tilt and to compute a tilt angle therefrom, wherein the tilt angle so computed is expressed as a pitch angle and a roll angle.

The geomagnetic sensor may further include a display, for displaying a designated alarm message informing that the dip angle calculation has an error.

Also, the geomagnetic sensor further includes a drive signal generator configured to generate a signal for driving the geomagnetic detection module.

In one exemplary embodiment, the geomagnetic detection module includes orthogonal X-axis and Y-axis fluxgates configured to respectively detect an electric signal corresponding to the geomagnetic filed when the drive signal is applied.

In one embodiment of the method for detecting a dip angle by a geomagnetic sensor as disclosed herein, the method includes: outputting an electrical signal having a magnitude corresponding to an external geomagnetic field; detecting an azimuth in a horizontal plane and storing the detected azimuth; measuring a tilt at present and computing a tilt angle thereof; and calculating a dip angle by using the electrical signal, the tilt angle, and the azimuth measured in the horizontal plane.

The method may further include measuring a tilt at present by using the orthogonal X-axis and Y-axis accelerometers, and computing tilt angle therefrom, said tilt angle being computed so as to be capable of being expressed as a tilt angle and a roll angle.

The outputting the electrical signal step may include detecting, from the orthogonal X-axis and Y-axis fluxgates, output values corresponding to the geomagnetic field, normalizing the output values to be in a designated range, and generating the electrical signal.

The azimuth may be calculated when the pitch angle is 0 degrees and the roll angle is 0 degrees. Therefore, by substituting 0 degrees for the pitch and roll angles in the equation for calculating the azimuth, the azimuth in a horizontal plane can be obtained.

In an exemplary embodiment, the tilt at present is measured by tilting the geomagnetic sensor until at least one of the pitch angle and the roll angle is determined to be greater than the predetermined threshold angle. If both the pitch angle and the roll angle are less than the predetermined threshold angle, an alarm message is provided to the user, informing the user that there is an error in the dip angle calculation.

BRIEF DESCRIPTION OF THE DRAWINGS

The above aspects and features of the sensors and methods disclosed herein will be more apparent by describing certain exemplary embodiments with reference to the accompanying drawings, in which.

DETAILED DESCRIPTION OF EXEMPLARY EMBODIMENTS

Figure 1:
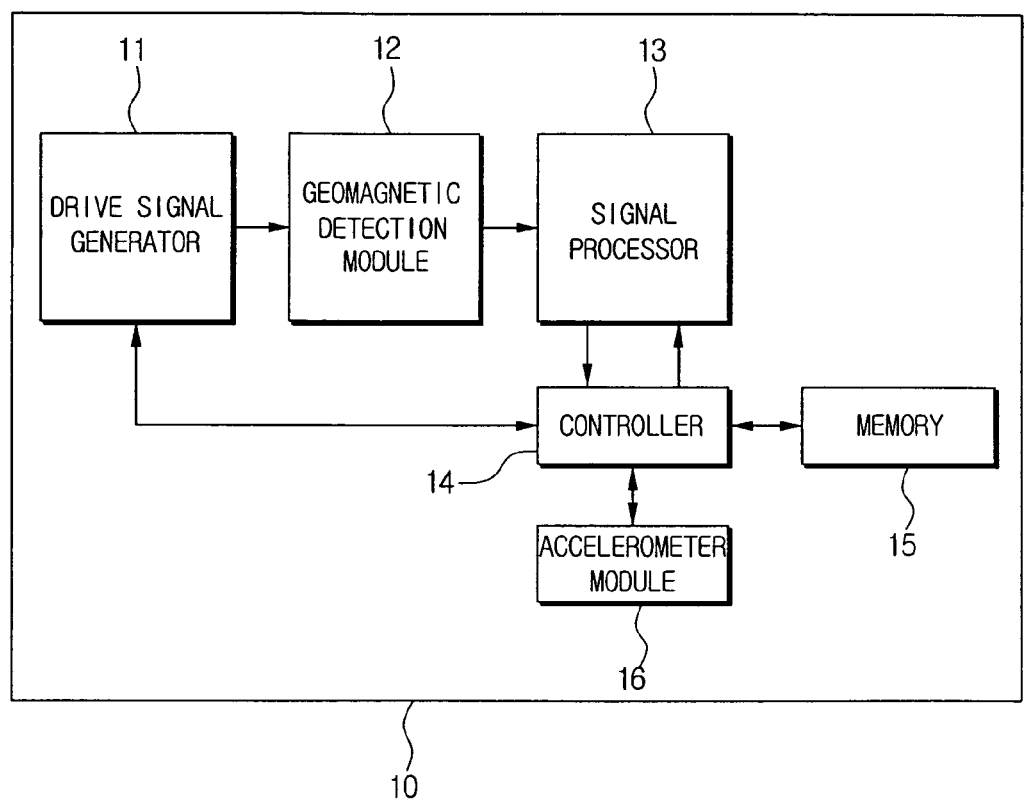
FIG. 1 is a schematic block diagram of a related art geomagnetic sensor.

Exemplary, non-limiting embodiments of the apparatuses and methods disclosed herein will be described herein below with reference to the accompanying drawings.

In the following description, the same drawing reference numerals are used for the same elements even in different drawings. The matters defined in the description such as a detailed construction and elements are provided to assist in a comprehensive understanding of the methods and apparatuses disclosed herein. Thus, it is apparent that the methods and apparatuses disclosed herein can be carried out without those defined matters. Also, well-known functions or constructions are not described in detail since such functions and constructions would be understood by those of ordinary skill in the art without such a description.

Figure 2:
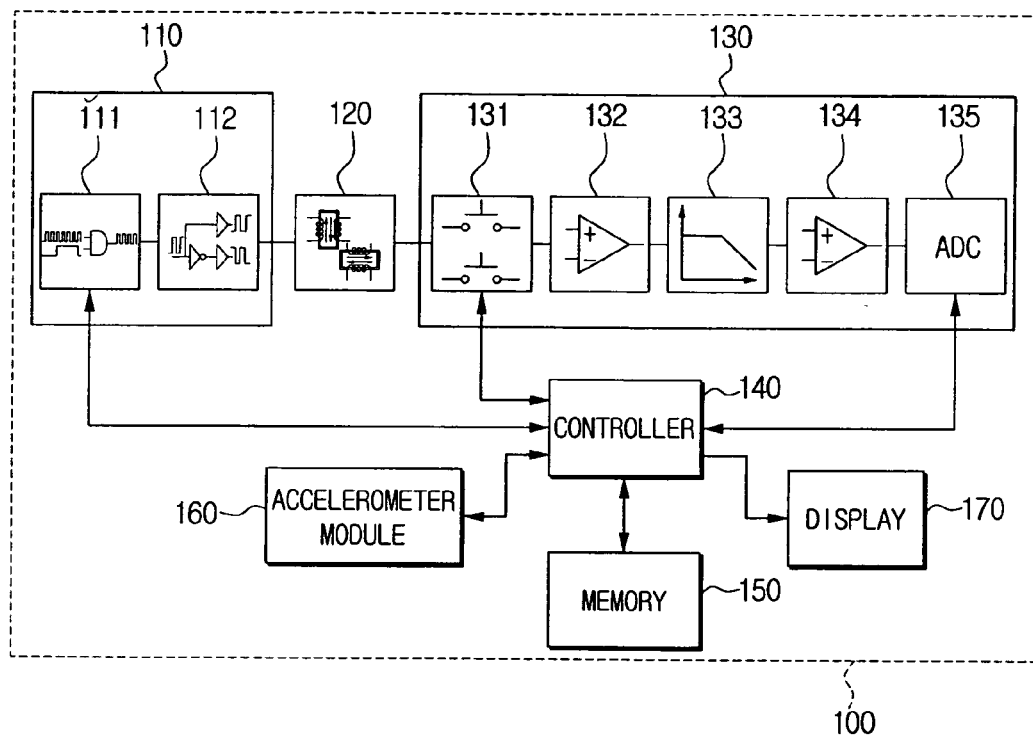
FIG. 2 is a schematic block diagram of a geomagnetic sensor consistent with one exemplary embodiment of the sensor disclosed herein.

FIG. 2 is a schematic block diagram of a geomagnetic sensor consistent with one embodiment of sensor disclosed herein. As shown in FIG. 2, the geomagnetic sensor 100 includes a drive signal generator 110, a geomagnetic detection module 120, a signal processor 130, a controller 140, a memory 150, an accelerometer module 160, and a display 170.

The drive signal generator 110 generates and outputs a signal for driving the geomagnetic detection module 120. In general, pulse-type and inverted pulse-type drive signals are used. The drive signal generator 110 includes a pulse generator (not shown), a pulse limiting unit 111, and a pulse amplifier 112. Therefore, the pulse generator outputs a pulse, the pulse limiting unit 111 selectively switches the pulse under a control signal, and the pulse amplifier 112 amplifies and inverts the pulse before outputting the pulse. As for the pulse limiting unit 111, an endgate can be used. The pulse limiting unit 111 outputs the pulse from the pulse generator in response to a control signal applied to one end of the endgate.

As for the pulse amplifier 112, several amps and inverters are used so that the pulse outputted through the pulse limiting unit 111 is later outputted by the pulse amplifier 112 as two pulse signals with opposite phases.

The geomagnetic detection module 120 includes two orthogonal X-axis and Y-axis fluxgates.

The geomagnetic detection module 120 is driven by a pulse signal and an inverted pulse signal that are transferred to the X-axis and the Y-axis fluxgates, respectively, and outputs a detection signal corresponding to an electromotive force generated by the driving. In FIG. 2, the X-axis and Y-axis fluxgates are installed in such a manner that two rectangular ring:shaped magnetic cores are disposed in two longitudinal directions, the X-axis and the Y-axis direction, respectively. Also, each magnetic cores is wound with both a drive coil and a detection coil.

When a drive pulse is applied to the drive coil, a magnetic field is generated in the X-axis and Y-axis fluxgates, and an induced electromotive force thereof can be detected through the detection coil.

Meanwhile, the signal processor 130 converts, through a certain process, the induced electromotive force into the voltage values for the X-axis and Y-axis fluxgates, respectively, and outputs the voltage values. To this end, the signal processor 130 includes a chopping circuit 131, a first amplifier 132, a filter 133, a second amplifier 134, and an A/D converter 135.

The electric signals induced to the X-axis and Y-axis fluxgates from the geomagnetic detection module 120 are chopped by controlling a plurality of switches built in the chopping circuit 131.

After the electric signals are chopped, the first amplifier 132 amplifies the chopped electric signals differentially, the filter 133 filters only signals in a certain range, and the second amplifier 134 finally amplifies the signals. Afterwards, the A/D converter 135 converts the signals into digital voltage values and output them.

The accelerometer module 160 includes an X-axis accelerometer and a Y-axis accelerometer, where the X-axis accelerometer is installed in the X-axis direction and the Y-axis accelerometer is installed in the Y-axis direction in the xy plane. Therefore, to express a three-dimensional space in terms of x, y, and z-axis, the accelerometer module 160 normalizes a voltage value measured by each axis accelerometer, and then calculates the pitch angle and the roll angle. Since the pitch angle and the roll angle are already explained before, they are not repeatedly described here.

Usually, the influence of the acceleration of gravity differs according to the position of an object or equipment. The accelerometer module 160 measures the acceleration of gravity of the object, and detects the components of the acceleration of gravity that are in parallel with the operation direction of the accelerometer module. Then, the accelerometer module 160 measures the angle, i.e. the tilt angle, between the detected components and the acceleration of gravity measured in the vertical direction.

The controller 140 normalizes, i.e., maps the electrical signals outputted from the geomagnetic detection module 120 and the accelerometer module 160 into values in a predetermined range. To this end, a developer of the geomagnetic sensor 100 rotates the geomagnetic sensor 100 while maintaining a horizontally stable posture, stores in the memory 150 the electrical signals outputted from the geomagnetic detection module 120 and the accelerometer module 160, and uses a maximum and a minimum value thereof to calculate a normalization factor. As its name implies, the normalization factor means a factor that is required for performing the normalization process.

The controller 140 calculates the normalization factor using the following Equation 1.

$$Xf_{bias} = \frac{(Xf_{max} + Xf_{min})}{2}, \quad Xf_{sf} = \frac{(Xf_{max} - Xf_{min})}{2}$$

$$Yf_{bias} = \frac{(Yf_{max} + Yf_{min})}{2}, \quad Yf_{sf} = \frac{(Yf_{max} - Yf_{min})}{2}$$

[Equation 1]

In Equation 1, $Xf_{max}$ and $Xf_{min}$ indicate a maximum and a minimum output value (Xf) of the X-axis fluxgate, $Yf_{max}$ and $Yf_{min}$ indicate a maximum and a minimum output value (Yf) of the Y-axis fluxgate, $Xf_{bias}$ and $Xf_{sf}$ indicate a bias and a scale factor of the X-axis fluxgate, respectively, and $Yf_{bias}$ and $Y_{sf}$ indicate a bias and a scale factor of the Y-axis fluxgate, respectively. Among others, the bias and the scale factor correspond to the above-mentioned normalization factor.

The controller 140 performs the normalization process by substituting the normalization factors obtained from Equation 1 in the following Equation 2.

$$Xf_{norm} = \frac{(Xf - Xf_{bias})}{Xf_{sf}} * \cos\lambda$$

$$Yf_{norm} = \frac{(Yf - Yf_{bias})}{Yf_{sf}} * \cos\lambda$$

[Equation 2]

In Equation 2, $Xf_{norm}$ indicates a normalized output value of the X-axis fluxgate, $Yf_{norm}$ indicates a normalized output value of the Y-axis fluxgate, Xf indicates the actual output value of the X-axis fluxgate, Yf indicates the actual output value of the Y-axis fluxgate, and $\lambda$ indicates a dip angle.

The normalization process is also required for measuring pitch angle and roll angle. That is, the accelerometer module 160 performs the normalization process by substituting in the following Equation 3 a maximum and a minimum output value of the X-axis and the Y-axis accelerometer stored in the memory 150.

$$Xt_{norm} = \frac{Xt - Xt_{bias}}{Xt_{sf}},$$

$$Xt_{bias} = \frac{(Xt_{max} + Xt_{min})}{2},$$

$$Xt_{sf} = \frac{(Xt_{max} - Xt_{min})}{2}$$

$$Yt_{norm} = \frac{Yt - Yt_{bias}}{Yt_{sf}},$$

$$Yt_{bias} = \frac{(Yt_{max} + Yt_{min})}{2},$$

$$Yt_{sf} = \frac{(Yt_{max} - Yt_{min})}{2}$$

[Equation 3]

In Equation 3, Xt indicates an output value of the X-axis accelerometer, $Y_t$ indicates an output value of the Y-axis accelerometer, $Xt_{norm}$ indicates a normalized output value of the X-axis accelerometer, $Yt_{norm}$ indicates a normalized output value of the Y-axis accelerometer, $Xt_{max}$ and $Xt_{min}$ indicate a maximum and a minimum of Xt, and $Yt_{max}$ and $Yt_{min}$ indicate a maximum and a minimum of Yt. As described above with reference to Equation 1, $Xf_{bias}$ and $Xf_{sf}$ indicate a bias and a scale factor of the X-axis fluxgate, respectively, and $Yf_{bias}$ and $Y_{sf}$ indicate a bias and a scale factor of the Y-axis fluxgate, respectively.

Substituting the $Xt_{norm}$ and $Yt_{norm}$, which are obtained from Equation 3, in Equation 4, the pitch angle and the roll angle of the xy plane can be obtained as follows.

$$\theta = \sin^{-1}(Xt_{norm})$$

$$\phi = \sin^{-1}\left(\frac{Yt_{norm}}{\cos\theta}\right)$$

[Equation 4]

In Equation 4, θ indicates the pitch angle, and φ indicates the roll angle.

By using the above-described Equations 1–4, the controller 140 maps the measurements provided by the geomagnetic detection module 120 and the accelerometer module 160 in a predetermined range, and then calculates azimuth based on the mapped values.

According to the tilt calibration algorithm, the controller 140 is able to obtain a normalized value of a virtual Z-axis using the following Equation 5.

$$Zf_{norm} = \frac{(Xf^*_{norm}\sin\theta - Yf^*_{norm}\cos\theta^*\sin\phi + \sin\lambda)}{\cos\theta^*\cos\phi} \quad \text{[Equation 5]}$$

In Equation 5, Zf indicates a voltage value of a virtual Z-axis fluxgate, and $Zf_{norm}$ indicates a normalized value of Zf. Once the $Zf_{norm}$ is obtained, the controller 140 calculates azimuth using the following Equation 6.

$$\psi = \tan^{-1}\left(\frac{Zf^*_{norm}\sin\phi - Yf^*_{norm}\cos\phi}{Xf^*_{norm}\cos\theta + Yf^*_{norm}\sin\theta\sin\phi + Zf^*_{norm}\sin\theta^*\cos\phi}\right) \quad \text{[Equation 6]}$$

In Equation 6, ψ, indicates an azimuth, and $Xf_{norm}$, $Yf_{norm}$, and $Zf_{norm}$ respectively indicate normalized output values of the X-axis the Y-axis, and the virtual Z-axis fluxgates.

One method for obtaining the normalized factors used in the above Equations 1–6 is that a sensor manufacturer installs the geomagnetic sensor 100 on the surface, and rotates the geomagnetic sensor 100 by employing a jig that enables the geomagnetic sensor 100 to rotate and tilt at a precise angle. From this procedure, maximum and minimum values are obtained and the normalization factors are easily calculated. However, for the user's convenience, the calibration algorithm can be executed directly.

In addition, if rapid calculation of the azimuth is more important than obtaining a precise azimuth, the tilt calibration (or compensation) algorithm is not recommended. Instead, the azimuth can be calculated independently of the dip angle, pitch angles and roll angle, by normalizing the electrical signal outputted from the geomagnetic module 120.

After substituting Equation 5 for Equation 6 and simplifying, the following Equation 7 for dip angle is obtained.

$$\lambda = \tan^{-1}\left(\frac{Xf^*_{est}(\sin\theta^*\sin\phi - \cos\phi^*\tan\psi) - Yf^*_{est}\cos\theta}{\sin\theta^*\cos\phi^*\tan\psi - \sin\phi}\right) \quad \text{[Equation 7]}$$

$$Xf_{est} = \frac{Xf - Xf_{bias}}{Xf_{sf}}, \quad Yf_{est} = \frac{Yf - Yf_{bias}}{Yf_{sf}}$$

In Equation 7, $Xf_{est}$ indicates an estimated output value of the X-axis fluxgate and $Yf_{est}$ indicates an estimated output value of the Y-axis fluxgate. Therefore, by using the above Equation 7, the controller 140 obtains the dip angle at the present position. Usually, the azimuth is measured in the horizontal plane, and is stored in the memory 150. This pre-stored azimuth is later used as the azimuth Ψ in Equation 7. In other words, the azimuth measured in the horizontal plane should coincide with the azimuth measured in a tilted plane. Thus, the azimuth is measured when the pitch angle and the roll angle are at 0 degrees, and is stored in the memory 150. The azimuth is then substituted in Equation 7. By using the pitch angle θ and the roll angle φ that are measured by the accelerometer module 160, and using the X-axis and Y-axis fluxgate output values that are measured by the geomagnetic detection module 120, the controller 140 calculates the dip angle from the above Equation 7.

For instance, to calculate the dip angle at the present invention, the user may tilt the geomagnetic sensor 100, so that the pitch angle thereof is at 40 degrees and the roll angle thereof is at 0 degrees, and then input a dip angle measure command.

To calculate the dip angle, the controller 140 reads the azimuth, which had been measured in the horizontal plane and stored in the memory 150, and substitutes, in Equation 7, 40 degrees for the pitch angle, 0 degrees for the roll angle, and the output values of all axis-fluxgates.

If both the pitch angle and the roll angle provided by the user are below a predetermined threshold angle, the controller 140 controls the display 170 to show an alarm message, informing the user that there is an error in the dip angle measurement. When the alarm message is displayed, the user tilts the geomagnetic sensor 100 again to get an appropriate magnitude of tilt, and then calculates the dip angle. The threshold angle is an experimental measurement that fits best into every area using the geomagnetic sensor and thus, falls in a range having the lowest error rate.

Figure 3:
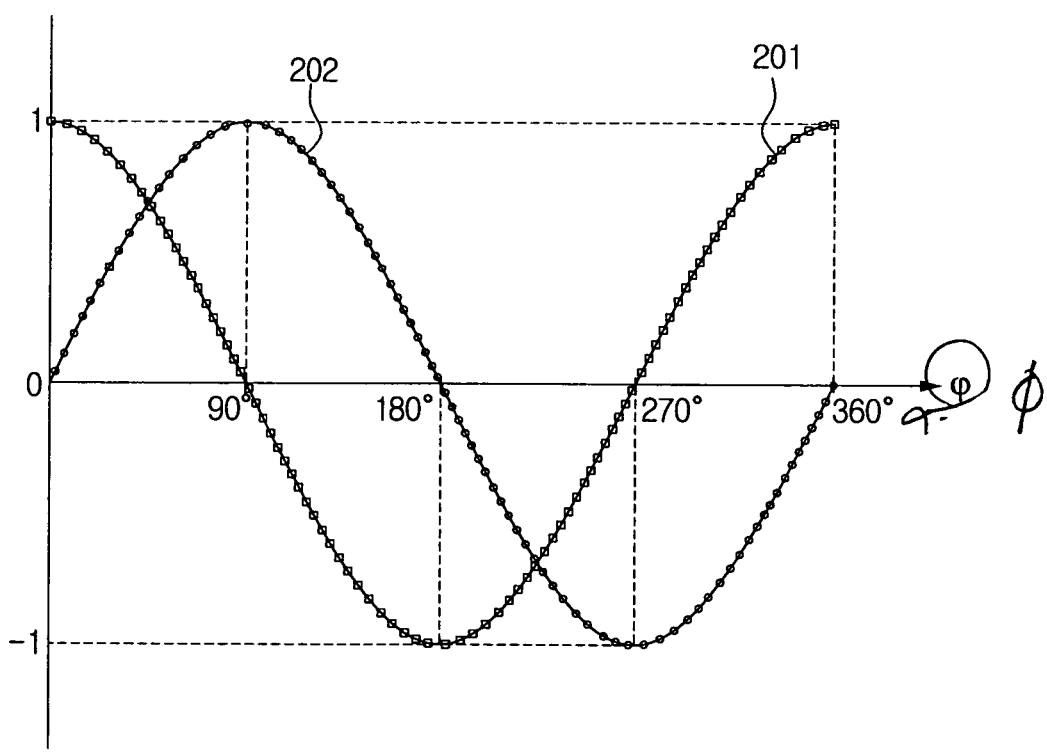
FIG. 3 is a graph illustrating output values of a geomagnetic detection module included in the geomagnetic sensor of FIG. 2.

FIG. 3 is a graph illustrating output values of the geomagnetic detection module 120 of the geomagnetic sensor 100 consistent with one exemplary embodiment of the sensor and methods disclosed herein. Referring to FIG. 3, the cosine graph 201 expresses the output values of the X-axis fluxgate with respect to the azimuth, and the sine graph 202 expresses the output values of the Y-axis fluxgate with respect to the azimuth. Therefore, without the tilt calibration algorithm, the controller 140 is able to calculate the azimuth using the equation: $\Psi = \tan^{-1}$ (Y-axis output value/X-axis output value). As depicted in FIG. 3, all output values are normalized within a range from 1 to −1.

Figure 4A:
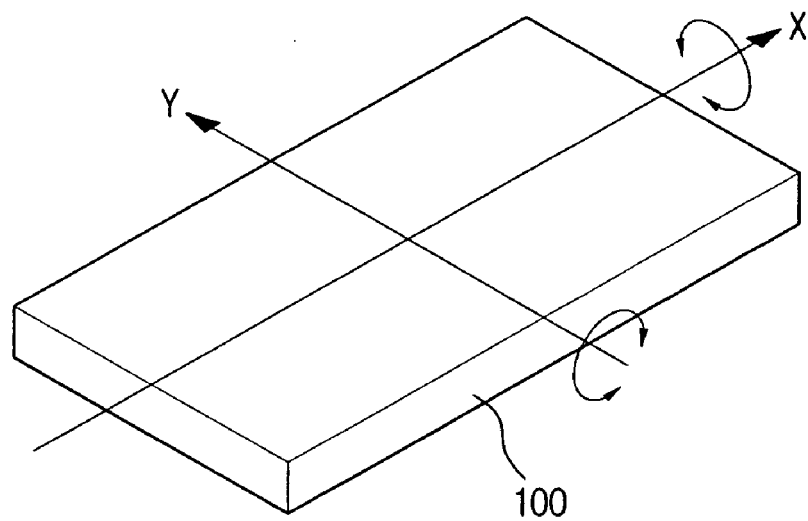
FIG. 4A and FIG. 4B, respectively, illustrate the change in a pitch angle and a roll angle on the geomagnetic sensor of FIG. 2.
Figure 4B:
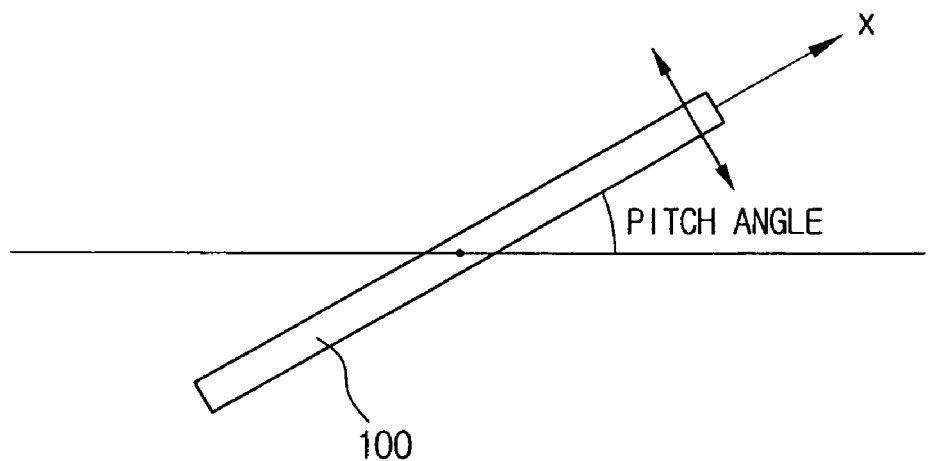

FIGS. 4A and 4B diagrammatically illustrates how the pitch angle and the roll angle change on the geomagnetic sensor 100. In particular, FIG. 4A illustrates the X-axis and the Y-axis on the geomagnetic sensor 100, where the X-axis is orthogonal to the Y-axis. When a user rotates the geomagnetic sensor 100 with respect to the X-axis, the angle between the xy plane and the geomagnetic sensor become the roll angle. In contrast, when a user rotates the geomagnetic sensor 100 with respect to the Y-axis, the angle between the xy plane and the geomagnetic sensor become the pitch angle.

For example, FIG. 4B illustrates a case where the user rotated the geomagnetic sensor 100 with respect to the Y-axis to set a certain pitch angle. As mentioned before, if the pitch angle is below the predetermined threshold angle, the controller 140 controls the display to give the user an alarm message.

Figure 5:
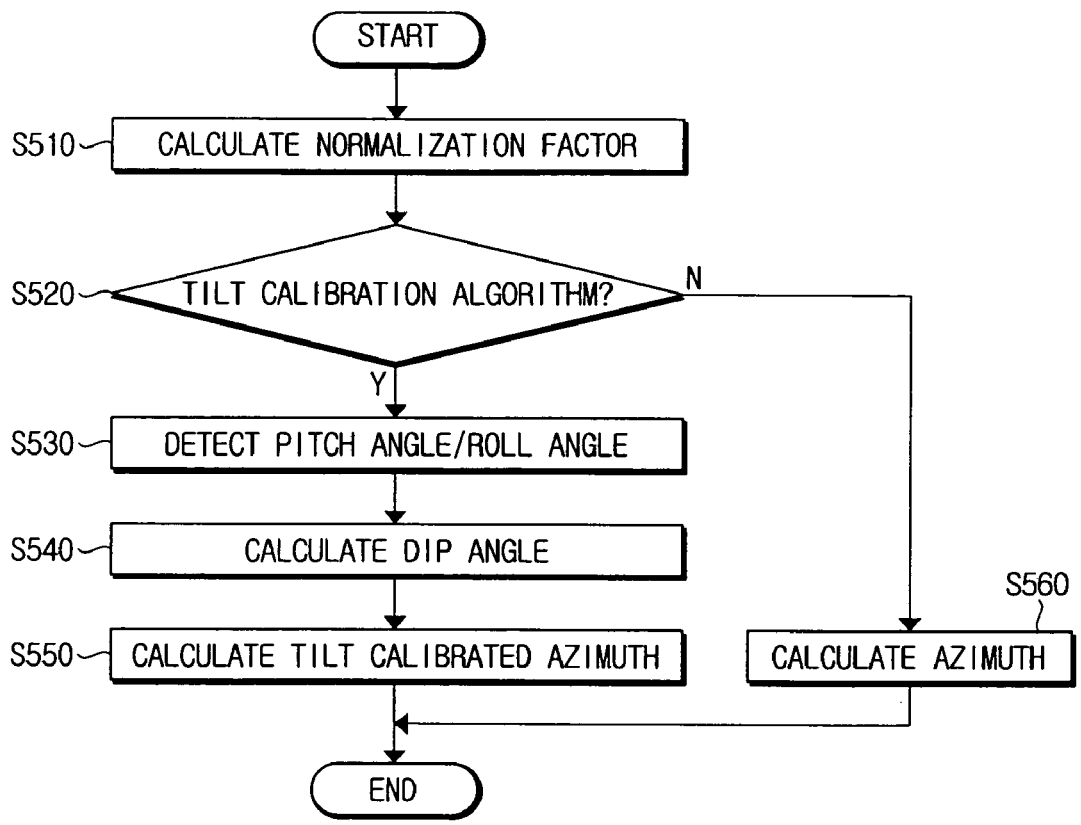
FIG. 5 is a flow chart describing a method for measuring an azimuth with a geomagnetic sensor consistent with the methods disclosed herein.

FIG. 5 is a flow chart describing a method for measuring the azimuth in the geomagnetic sensor 100. Referring to FIG. 5, calculating normalization factors is the first step (S510). This is accomplished by rotating once the geomagnetic sensor 100 at the horizontal position, measuring fluxgate output values, obtaining maximum and minimum output values, and substituting these output values in Equation 1.

Next, the user is asked whether to apply the tilt calibration algorithm (S520). By using a designated input means, the user can choose to calculate the azimuth according to the tilt calibration algorithm or simply calculate the azimuth without considering the influence of tilt.

If the user chooses not to apply the tilt calibration algorithm, the controller 140 substitutes the output value of the geomagnetic detection module 120 in equation: $\Psi = \tan^{-1}$ (Y-axis output value/X-axis output value) to obtain the azimuth $\Psi$ (S560).

On the other hand, if the user chooses to apply the tilt calibration algorithm, the accelerometer module 160 detects the pitch angle and the roll angle (S530). In this case, the pitch angle and the roll angle can be obtained using Equations 3 and 4.

Figure 6:
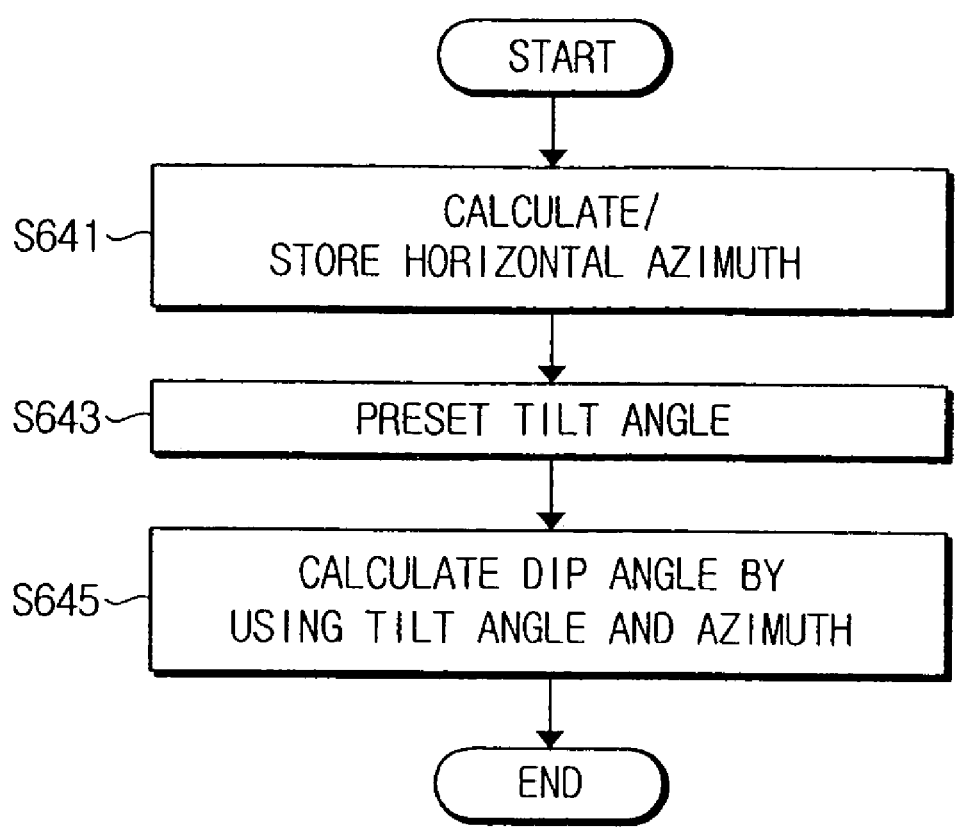
FIG. 6 is a flow chart describing a method for measuring a dip angle with a geomagnetic sensor consistent with the methods disclosed herein.

By using the azimuth in the horizontal plane, the pitch angle, and the roll angle, the dip angle at the present position is deteeted calculated (S540). FIG. 6 is a flow chart describing a method for calculating the dip angle $\lambda$ by the controller 140 of the geomagnetic sensor 100. As shown in FIG. 6, the controller 140 stores the azimuth measured in the horizontal plane in the memory 150 (S641). If a certain tilt angle is set (S643), the controller 140 calculates the dip angle using Equation 7 (S645).

Once the dip angle is calculated, the controller 140 can calculate the tilt calibrated azimuth using Equations 5 and 6 (S550).

Preferably, if the pre-set tilt angle set by the user is less than the predetermined threshold angle, the controller 140 controls the display 170 to display a designated alarm message to the user. Here, the threshold angle is an experimental measurement that fits best into an area using the geomagnetic sensor 100 and thus, falls in a range having the lowest error rate.

In conclusion, the sensor and methods disclosed herein make it possible to calculate the dip angle, so that the geomagnetic sensor 100 does not need to wait for the dip angle to be inputted from outside, or apply an arbitrary angle.

Moreover, according to the methods disclosed herein, the user can preset the tilt angle arbitrarily and then based on this tilt angle and the azimuth measured in the horizontal plane, the dip angle can be calculated. In short, the user is able to easily and conveniently calculate the tilt angle required for the calculation of the dip angle.

The foregoing embodiment and advantages are merely exemplary and are not to be construed as limiting the present invention as defined by the claims. The present teachings can be readily applied to other types of apparatuses. Also, the description of the embodiments are intended to be illustrative, and not to limit the scope of the claims, and many alternatives, modifications, and variations will be readily apparent to those skilled in the art.

What is claimed is:

1. A geomagnetic sensor, comprising:
   a geomagnetic detection module configured to output an electrical signal having a magnitude corresponding to a magnetic field;
   a memory configured to store an azimuth measured in a horizontal plane;
   an accelerometer module configured to measure a tilt at present, and to compute a tilt angle therefrom; and
   a controller configured to calculate a dip angle by using the electrical signal outputted from the geomagnetic detection module, the tilt angle, and the horizontal azimuth.

2. The geomagnetic sensor according to claim 1, wherein the accelerometer module comprises orthogonal X-axis and Y-axis geomagnetic sensors configured to detect the tilt and to compute a tilt angle therefrom, and
   wherein the tilt angle so computed is expressed as a pitch angle and a roll angle.

3. The geomagnetic sensor according to claim 2, further comprising:
   a display configured to display a designated alarm message informing that a dip angle calculation has an error if the tilt angle detected by the accelerator module is less than a predetermined threshold angle.

4. The geomagnetic sensor according to claim 3, further comprising:
   a drive signal generator configured to generate a signal for driving the geomagnetic detection module.

5. The geomagnetic sensor according to claim 1, wherein the geomagnetic detection module comprises orthogonal X-axis and Y-axis fluxgates configured to respectively detect an electrical signal corresponding to the geomagnetic field when the drive signal is applied.

6. The geomagnetic sensor according to claim 5, wherein the controller calculates the dip angle using the following equations:

$$\lambda = \tan^{-1}\left(\frac{Xf^*_{est}(\sin\theta^*\sin\phi - \cos\phi^*\tan\psi) - Yf^*_{est}\cos\theta}{\sin\theta^*\cos\phi^*\tan\psi - \sin\phi}\right)$$

$$Xf_{est} = \frac{Xf - Xf_{bias}}{Xf_{sf}}, \quad Yf_{est} = \frac{Yf - Yf_{bias}}{Yf_{sf}}$$

$$Xf_{bias} = \frac{(Xf_{max} + Xf_{min})}{2}, \quad Xf_{sf} = \frac{(Xf_{max} - Xf_{min})}{2}$$

$$YF_{bias} = \frac{(YF_{max} + YF_{min})}{2}, \quad YF_{sf} = \frac{(YF_{max} - YF_{min})}{2}$$

in here, $\lambda$ indicates a dip angle; Xf, $Xf_{max}$, and $Xf_{min}$ indicate an output value, a maximum output value, and a minimum output value of the X-axis fluxgate, respectively; Yf, $Yf_{max}$, and $Yf_{min}$ indicate an output value, a maximum output value, and a minimum output value of the Y-axis fluxgate, respectively; $\theta$ indicates a pitch angle; $\phi$ indicates a roll angle; and $\psi$ indicates an azimuth measured in a horizontal plane.

7. A method for detecting a dip angle by a geomagnetic sensor, the method comprising:
   outputting an electrical signal having a magnitude corresponding to an external geomagnetic field;
   detecting an azimuth in a horizontal plane and storing the detected azimuth;
   measuring a tilt at present and computing a tilt angle thereof; and calculating a dip angle by using the electrical signal, the tilt angle, and the azimuth measured in the horizontal plane.

8. The method according to claim 7, further comprising:
measuring a tilt at present by using the orthogonal X-axis and Y-axis accelerometers, and computing the tilt angle therefrom, said tilt angle being computed so as to be capable of being expressed as a tilt angle and a roll angle.

9. The method according to claim 8, wherein outputting the electrical signal comprises:
detecting output values corresponding to the geomagnetic field from the orthogonal X-axis and Y-axis fluxgates;
normalizing the output values to be in a designated range; and
generating the electrical signal.

10. The method according to claim 9, wherein the azimuth is calculated when the pitch angle is 0 degrees and the roll angle is 0 degrees.

11. The method according to claim 10, wherein the tilt at present is measured by tilting the geomagnetic sensor until at least one of the pitch angle and the roll angle is determined to be greater than the predetermined threshold angle.

12. The method according to claim 9, wherein the dip angle is calculated using the following equations:

$$\lambda = \tan^{-1}\left(\frac{Xf^*_{est}(\sin\theta^*\sin\phi - \cos\phi^*\tan\psi) - Yf^*_{est}\cos\theta}{\sin\theta^*\cos\phi^*\tan\psi - \sin\phi}\right)$$

$$Xf_{est} = \frac{Xf - Xf_{bias}}{Xf_{sf}}, \quad Yf_{est} = \frac{Yf - Yf_{bias}}{Yf_{sf}}$$

$$Xf_{bias} = \frac{(Xf_{max} + Xf_{min})}{2}, \quad Xf_{sf} = \frac{(Xf_{max} - Xf_{min})}{2}$$

$$YF_{bias} = \frac{(YF_{max} + YF_{min})}{2}, \quad YF_{sf} = \frac{(YF_{max} - YF_{min})}{2}$$

in here, $\lambda$ indicates a dip angle; Xf, $Xf_{max}$, and $Xf_{min}$ indicate an output value, a maximum output value, and a minimum output value of the X-axis fluxgate, respectively; Yf, $Yf_{max}$, and $Yf_{min}$ indicate an output value, a maximum output value, and a minimum output value of the Y-axis fluxgate, respectively; $\theta$ indicates a pitch angle; $\phi$ indicates a roll angle; and $\psi$ indicates an azimuth measured in a horizontal plane.

* * * * *